(12) United States Patent
Hamamoto et al.

(10) Patent No.: US 8,394,541 B2
(45) Date of Patent: *Mar. 12, 2013

(54) LITHIUM SECONDARY BATTERY AND NON-AQUEOUS ELECTROLYTIC SOLUTION

(75) Inventors: Toshikazu Hamamoto, Yamaguchi (JP); Akira Ueki, Yamaguchi (JP); Koji Abe, Yamaguchi (JP); Kazuhiro Miyoshi, Yamaguchi (JP)

(73) Assignee: Ube Industries, Ltd., Ube-shi, Yamaguchi (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/164,826

(22) Filed: Jun. 21, 2011

(65) Prior Publication Data

US 2011/0250504 A1    Oct. 13, 2011

Related U.S. Application Data

(60) Division of application No. 11/948,617, filed on Nov. 30, 2007, now Pat. No. 7,981,552, and a continuation of application No. 10/398,184, filed as application No. PCT/JP01/08724 on Oct. 3, 2001, now abandoned.

(30) Foreign Application Priority Data

Oct. 3, 2000    (JP) ................................ 2000-303641
Jan. 24, 2001    (JP) ................................ 2001-015468

(51) Int. Cl.
  *H01M 6/16*    (2006.01)
  *H01M 4/58*    (2010.01)
(52) U.S. Cl. ........ 429/332; 429/324; 429/326; 429/331; 429/231.95
(58) Field of Classification Search .................. 429/332, 429/324, 326, 331, 231.95
See application file for complete search history.

(56) References Cited

U.S. PATENT DOCUMENTS

| 4,321,114 | A | 3/1982 | MacDiarmid et al. |
| 5,759,714 | A | 6/1998 | Matsufuji et al. |
| 6,074,777 | A | 6/2000 | Reimers et al. |

FOREIGN PATENT DOCUMENTS

| EP | 0 746 050 A1 | 12/1996 |
| EP | 0 759 641 A1 | 2/1997 |
| EP | 0 776 058 A2 | 5/1997 |
| EP | 1 065 744 A2 | 1/2001 |
| JP | 05-036439 | 2/1993 |
| JP | 09-050822 | 2/1997 |
| JP | 10-275632 A | 10/1998 |
| JP | 2000-215909 A | 8/2000 |
| JP | 2001 015155 | 1/2001 |
| JP | 2001 110443 | 4/2001 |
| JP | 2001-167791 A | 6/2001 |
| WO | WO 99/09606 | 2/1999 |

OTHER PUBLICATIONS

Supplemental European Search Report/EP 01 97 2678/dated Apr. 13, 2006.

*Primary Examiner* — Helen O Conley
(74) *Attorney, Agent, or Firm* — Nixon Peabody LLP; Jeffrey L. Costellia

(57) ABSTRACT

The sudden generation of heat being frequently caused in the case of the overcharge of a lithium secondary cell which have a positive electrode comprising a composite metal oxide of lithium and cobalt or a composite metal oxide of lithium and nickel, a negative electrode comprising metallic lithium, a lithium alloy or a material capable of occluding and releasing lithium, and a nonaqueous electrolyte solution comprising a nonaqueous solvent and an electrolyte dissolved therein can be efficiently prevented by the addition, to the nonaqueous electrolyte solution, of an organic compound which, when the lithium secondary cell is overcharged, decomposes into a decomposition product capable of dissolving out the cobalt or nickel contained in the positive electrode and depositing it ion the negative electrode (for example, a tert-alkylbenzene derivative).

9 Claims, No Drawings

US 8,394,541 B2

LITHIUM SECONDARY BATTERY AND NON-AQUEOUS ELECTROLYTIC SOLUTION

FIELD OF INVENTION

The present invention relates to a lithium secondary battery and a non-aqueous electrolytic solution which is favorably employable for the lithium secondary battery. The invention specifically relates to a lithium secondary battery improved in battery characteristics such as cycle performance, battery capacity and storage performance and further in its safety such as prevention of sudden heat generation which is caused in the case of overcharging, and a non-aqueous electrolytic solution which is favorably employable for the lithium secondary battery.

BACKGROUND OF INVENTION

At present, a lithium secondary battery is generally employed as an electric source for driving small electronic devices. The lithium secondary battery is expected not only for the use as a portable electronic/communication tool such as small size video camera, portable phone, and note-size personal computer but also an electric source of automobile. The lithium secondary battery essentially comprises a positive electrode, a non-aqueous electrolyte solution, separator, and a negative electrode. A lithium secondary battery utilizing a positive electrode of lithium compound oxide such as $LiCoO_2$ and a negative electrode of carbonaceous material or lithium metal is generally used. As the electrolyte solution, a carbonate such as ethylene carbonate (EC) or propylene carbonate (PC) is generally used.

When the lithium secondary battery is overcharged to a level higher than the ordinary working voltage, an excessive amount of lithium is released from the positive electrode, and simultaneously excessive lithium deposits on the negative electrode, and dendrite is produced. Therefore, both of the positive electrode and the negative electrode are rendered chemically unstable. If both of the positive and negative electrodes become chemically unstable, they soon react with carbonate in the non-aqueous electrolyte solution to decompose the carbonate, and sudden exothermic reaction occurs. Accordingly, the battery as such generates abnormal heat, and trouble of lowering of battery safety occurs. The trouble will be more serious in the case that the energy density of a lithium secondary battery increases.

Japanese Patent Provisional Publication 7-302614, for instance, proposes that a small amount of an aromatic compound be added to the electrolyte solution so that the safety to the overcharging can be ensured and the above-described trouble can be obviated. The Japanese Patent Provisional Publication 7-302614 describes anisole derivatives that have a molecular weight of not more than 500 and a π-electron orbital showing a reversible oxidation-reduction potential at a potential of more noble than the positive electrode potential in the case of full charging. It is explained that the anisole derivative functions as a redox shuttle in the battery so as to ensure safety of battery when the battery is overcharged.

Japanese Patent Provisional Publication 9-106835 discloses a method for ensuring safety of a battery under overcharging condition by employing carbonaceous material as the negative electrode and incorporating approx. 1 to 4% of an additive such as biphenyl, 3-R-thiophene, 3-chlorothiophene or furan into the electrolyte solution so that biphenyl or the like produces a polymer to enhance internal resistance of the battery when the voltage of the battery exceeds the predetermined maximum working voltage.

Japanese Patent Provisional Publication 9-171840 discloses a method for ensuring safety of a battery under overcharging condition by similarly employing biphenyl, 3-R-thiophene, 3-chlorothiophene or furan which polymerizes to produce gaseous material so as to initiate the internal current-disconnecting apparatus for forming internal short-circuit when the voltage of the battery exceeds the predetermined maximum working voltage.

Japanese Patent Provisional Publication 10-321258 discloses a method for ensuring safety of a battery under overcharging condition by similarly employing biphenyl, 3-R-thiophene, 3-chlorothiophene or furan which polymerizes to produce an electro-conductive polymer for forming internal short-circuit when the voltage of the battery exceeds the predetermined maximum working voltage.

Japanese Patent Provisional Publication 11-162512 points out a problem in the use of an additive such as biphenyl or the like in a battery in that the battery characteristics such as cycle characteristic are apt to lower when the cyclic procedure is repeated up to a voltage exceeding 4.1 V or the battery is discharged at a high temperature exceeding 40° C. for a long period of time, and that this problem is more prominently observed when the addition amount of additive increases. For ensuring a battery under over-charging condition, this publication then proposes an electrolyte solution in which 2,2-diphenylpropane or other additive is incorporated and the 2,2-diphenylpropane or the like polymerizes to produce a gaseous material to initiate the internal current-disconnecting apparatus or give an electro-conductive polymer for forming the internal short-circuit when the voltage of the battery exceeds the predetermined maximum working voltage.

Although the anisole derivative disclosed in Japanese Patent Provisional Publication 7-302614 favorably functions by redox shuttle in the case of overcharging, it has problems in that adverse effects are observed on cycle characteristics and storage stability. In more detail, the anisole derivative described in the publication gradually decomposes in the charge-discharge procedure when the battery is employed at a high temperature such as higher than 40° C. or subjected locally to a relatively high voltage in the use at an ordinary working voltage. Therefore, the battery characteristics lower. Thus, the amount of an anisole derivative gradually decreases in the course of ordinary charge-discharge procedures, and hence the safety may not be ensured after the charge-discharge procedures of 300 cycles.

The biphenyl, 3-R-thiophene, 3-chlorothiophene, and furan described in Japanese Patent Provisional Publications 9-106835, 9-171840, and 10-321258 also favorably work when overcharging occurs. However, as is pointed out in the aforementioned Japanese Patent Provisional Publication 11-162512, they impart adverse effect to the cycle characteristics and storage stability. Further, the adverse effect increases when the amount of biphenyl and the like is increased. In more detail, the biphenyl or the like is oxidized and decomposes at a potential of 4.5 V or less. Therefore, the biphenyl or the like decomposes in the charge-discharge procedure when the battery is employed at a high temperature such as higher than 40° C. or subjected locally to a relatively high voltage in the use at an ordinary working voltage. Therefore, the battery characteristics lower. Thus, the amount of a biphenyl or the like gradually decreases in the course of ordinary charge-discharge procedures, and hence the safety may not be ensured after the charge-discharge procedures of 300 cycles.

The battery containing 2,2-diphenylpropane which is described in Japanese Patent Provisional Publication 11-162512 does not show such a high safety at the time of overcharging as the safety shown in the battery containing biphenyl. However, it still show a high safety at the time of overcharging, as compared with a battery containing no additive. Further, although the battery containing 2,2-diphenyl-propane shows high cycle characteristics as compared with the cycle characteristics shown in the battery containing biphenyl, it still does not show such high cycle characteristics, as compared with a battery containing no additive. Thus, the publication describes that the good cycle characteristics maybe accomplished only when the safety is partially ignored. In consequence, it does not satisfy either battery characteristics or safety such as prevention of overcharging.

The invention has an object to provide a lithium secondary battery which are free from the above-mentioned problems, that is, which is improved in safety such as prevention of sudden heat generation at the time of overcharging, and other battery characteristics such as cycle characteristics, electric capacity and storage stability.

DISCLOSURE OF INVENTION

The present invention resides in a method of preventing sudden heat generation when a lithium secondary battery comprising a positive electrode comprising a composite metal oxide of lithium and cobalt or a composite metal oxide of lithium and nickel, a negative electrode comprising a lithium metal, a lithium alloy or a material capable occluding and releasing lithium, and a non-aqueous electrolyte solution comprising an electrolyte in a non-aqueous solvent is overcharged, which comprises dissolving an organic compound in the non-aqueous electrolyte solution, decomposing the organic compound when the overcharging takes place, to give a decomposed product, the decomposed product functioning to dissolve cobalt or nickel out of the positive electrode, and deposit the cobalt or nickel on the negative electrode.

The invention further resides in a lithium secondary battery comprising a positive electrode comprising a composites metal oxide of lithium and cobalt or a composite metal oxide of lithium and nickel, a negative electrode comprising a lithium metal, a lithium alloy or a material capable occluding and releasing lithium, and a non-aqueous electrolyte solution comprising an electrolyte in a non-aqueous solvent, in which an organic compound is contained in the non-aqueous electrolyte solution, said organic compound decomposing when overcharging of the secondary battery takes place to give a decomposed product, said decomposed product functioning to dissolve cobalt or nickel out of the positive electrode and deposit the cobalt or nickel on the negative electrode.

The invention furthermore resides in a lithium secondary battery comprising a positive electrode comprising a composite metal oxide of lithium and cobalt or a composite metal oxide of lithium and nickel, a negative electrode comprising a lithium metal, a lithium alloy or a material capable occluding and releasing lithium, and a non-aqueous electrolyte solution comprising an electrolyte in a non-aqueous solvent, in which the non-aqueous electrolyte solution contains an organic compound having an oxidation potential in the range of +4.6 V to +5.0 V, which is determined relatively to the oxidation potential of lithium.

The invention furthermore resides in a non-aqueous electrolyte solution to be used for a lithium secondary battery comprising a positive electrode comprising a composite metal oxide of lithium and cobalt or a composite metal oxide of lithium and nickel, a negative electrode comprising a lithium metal a lithium alloy or a material capable occluding and releasing lithium, and a non-agueous electrolyte solution comprising an electrolyte in a non-aqueous solvent, which further contains an organic compound having an oxidation potential in the range of +4.6 V to +5.0 V, which is determined relatively to the oxidation potential of lithium.

As described hereinbefore, known methods for preventing sudden heat generation caused by overcharging (i.e., thermal runaway) so as to ensure safety of the battery are as follows: the method of functioning redox shuttle at a potential of approx. 4.5 V; the method of increasing the internal resistance by producing a polymer at a potential of 4.5 V or lower; and the method of forming a short circuit in the battery by producing a gaseous material to initiate an internal current-disconnecting device or by producing an electro-conductive polymer.

In contrast, the mechanism of the prevention of overcharging according to the invention is considered as follows:

When the battery is overcharged, the above-mentioned compound contained in the non-aqueous electrolyte solution oxidatively decomposes at a potential in the range of +4.6 V to +5.0 V, as compared with the lithium, and cobalt or nickel in the positive electrode dissolves out and deposits on the negative electrode. It is assumed that the cobalt or nickel deposited on the negative electrode prevent reaction between the lithium metal deposited on the negative electrode and the carbonate contained in the non-aqueous electrolyte solution.

Further, the deposition of cobalt or nickel an the negative electrode of the battery may sometimes cause formation of short circuit so that the prevention of overcharging can be made. Thus, the safety of battery is sufficiently ensured.

Furthermore, since the aforementioned organic compound has a high oxidation potential of +4.6 V to +5.0 V, as compared with the oxidation potential of lithium, the organic compound does not decompose at a temperature of 40° C. or higher, in the course of repeated charge-discharge procedures and in the case that the voltage locally exceeds 4.2 V.

Accordingly, a lithium secondary battery having not only good safety for preventing overcharging but also good battery characteristics such as cycle characteristics, battery capacity and storage stability is provided.

BEST EMBODIMENTS FOR PERFORMING INVENTION

Examples of the organic compounds to be incorporated into the electrolyte solution according to the invention include the following compounds. The oxidation potential of each organic compound, as compared with that of lithium (determined in the manner described in the below-stated working examples) is described in parenthesis.

As the organic compound, at least one of tert-alkyl-benzene derivatives is preferably used. Examples are as follows: tert-butylbenzene derivatives such as tert-butylbenzene (4.9 V), 1-fluoro-4-tert-butylbenzene (4.9 V), 1-chloro-4-tert-butylbenzene (4.9 V), 1-bromo-4-tert-butylbenzene (4.9 V), 1-iodo-4-tert-butylbenzene (4.9 V), 5-tert-butyl-m-xylene (4.6 V), 4-tert-butyltoluene (4.7 V), 3,5-di-tert-butyltoluene (4.8 V), 1,3-di-tert-butyl-benzene (4.9 V), 1,4-di-tert-butyl-benzene (4.9 V), 1,3,5-tri-tert-butylbenzene (5.0 V); and tert-alkylbenzene derivatives such as tert-pentylbenzene (4.8 V), 1-methyl-4-tert-pentylbenzene (4.7 V), 5-tert-pentyl-m-xylene (4.6 V), 1-ethyl-1-(methylpropyl)benzene (4.8 V), (1,1-di-ethylpropyl)benzene (4.8 V), 1,3-di-tert-pentylbenzene (4.7 V), and 1, 4-di-tert-pentylbenzene (4.7 V).

As the organic compound, cyclohexylbenzene (4.7 V) is also employed. Particularly, if a portion of the organic compound having a high oxidation-potential such as within 4.8-5.0 V such as the above-mentioned tert-butylbenzene is replaced with cyclohexylbenzene having a low oxidation potential such as 4.7 V, the prevention of overcharging is enhanced. In the case that a portion of the tert-butylbenzene is replaced with cyclohexylbenzene, the tert-butylbenzene is preferably employed in an amount of 4 or less parts, more preferably 0.3 to 3 parts, most preferably 0.5 to 2.5 parts, per one part of cyclohexylbenzene. As is described above, the use of combination of two or more organic compounds having different oxidation potentials is effective to enhance the prevention of overcharging. However, the compound of the present invention is not restricted by these compounds, so long as the organic compounds decompose at a potential in the range of +4.6 V to +5.0 V and the cobalt or nickel in the positive electrode dissolves in the solution at the time of overcharging.

If the amount of the organic compound is excessively large, the electric conductivity of the electrolyte solution may vary and hence the battery characteristics may lower. If the amount is too small, enough effect to prevent sudden heat generation caused by overcharging is attained. The amount preferably is in the range of 0.1 to 10 weight %, more preferably 1 to 5 weight %, per the amount of the electrolyte solution.

Examples of the non-aqueous solvents employed in the invention include cyclic carbonates such as ethylene carbonate (EC), propylene carbonate (PC), butylene carbonate (BC), and vinylene carbonate (VC); lactones such as γ-butyrolactone; linear carbonates such as dimethyl carbonate (DMC), methyl ethyl carbonate (MEC), and diethyl carbonate (DEC); ethers such as tetrahydrofuran, 2-methyl-tetrahydrofuran, 1,4-dioxane, 1,2-dimethoxyethane, 1,2-diethoxyethane, and 1,2-dibutoxyethane; nitriles such as acetonitrile; esters such as methyl propionate, methyl pivalate and octyl pivalate; and amides such as dimethyl-formamide.

The non-aqueous solvents can be employed singly or in combination of two or more. There are no limitations with respect to the combinations. Examples are a combination of a cyclic carbonate and a linear carbonate, a combination of a cyclic carbonate and a lactone, and a combination of three cyclic carbonates and a linear carbonate.

Examples of the electrolytes include $LiPF_6$, $LiBF_4$, $LiClO_4$, $LiN(SO_2CF_3)_2$, $LiN(SO_2C_2F_5)_2$, $LiC(SO_2CF_3)_3$, $LiPF_4(CF_3)_2$, $LiPF_3(C_2F_5)_3$, $LiPF_3(CF_3)_3$, $LiPF_3(iso-C_3F_7)_3$, and $LiPF_6(iso-C_3F_7)$. These electrolytes can be employed singly or in combination of two or more. Generally, the electrolyte can be incorporated into the non-aqueous solvent in such an amount to give an electrolyte solution of 0.1 M to 3 M, preferably 0.5 M to 1.5 M.

The electrolyte solution can be prepared, for instance, by mixing the above-mentioned non-aqueous solvents and dissolving at least one organic compound in the mixed solvents.

The electrolyte solution of the invention is favorably employable as an element for manufacture of a secondary battery, particularly a lithium secondary battery. There are no specific restrictions with respect to other constitutional elements. Various heretofore-employed elements can be used.

For instance, compound metal oxides comprising lithium and cobalt or nickel are employable as the positive electrode active materials. Examples of the compound metal oxides include $LiCoO_2$, $LiNiO_2$, and $LiCo_{1-x}Ni_xO_2$ (0.01<x<1). Further, a mixture of $LiCoO_2$ and $LiMn_2O_4$, a mixture of $LiCoO_2$ and $LiNiO_2$, and a mixture of $LiMn_2O_4$ and $LiNiO_2$ can be employed.

The positive electrode can be manufactured by kneading the above-mentioned positive active material, an electro-conductive material such as acetylene black or carbon black, and a binder such as poly(tetrafluoroethylene) (PTFE), poly(vinylidene fluoride) (PVDF), styrene-butadiene copolymer (SBR), acrylonitrile-butadiene copolymer (NBR), or carboxymethylcellulose (CMC) to give a positive electrode composition; coating the positive electrode composition on a collector such as aluminum foil, stainless foil, or lath plate; and beating the coated composition in vacuo at a temperature of approximately 50 to 250° C. for approximately 2 hours.

As the negative electrode active material, a lithium metal, lithium alloys, carbonaceous materials capable of occluding and releasing lithium (thermally decomposed carbons, cokes, graphites (artificial graphite and natural graphite), fired organic polymer compounds, carbonaceous fibers), and compound tin oxides can be employed. It is preferred to employ carbonaceous materials having a graphite crystal structure in which the lattice distance of lattice surface (002), namely, $d_{002}$, is in the range of 0.335 to 0.340 nm (nanometer). The negative electrode active material in the powdery form such as carbonaceous powder is preferably used in combination with a binder such as ethylene propylene diene terpolymer (EPDM), poly-tetrafluoroethylene (PTFE), poly(vinylidene fluoride) (PVDF), styrene-butadiene copolymer (SBR), acrylonitrile-butadiene copolymer (NBR) or carboxymethylcellulose (CMC).

There are no specific limitations with respect to the structure of the non-aqueous secondary battery. For instance, the non-aqueous secondary battery can be a battery of coin type or a polymer battery comprising a positive electrode, a negative electrode, and single or plural separators, or a cylindrical or prismatic battery comprising a positive electrode, a negative electrode, and a separator roll. The separators can be known separators such as micro-porous separators of polyolefin, other micro-porous films, woven fabrics and non-woven fabrics.

The lithium secondary battery of the invention shows excellent cycle characteristics for along period of time even at a high working voltage such as a voltage higher than 4.2 V, and further shows excellent cycle characteristics even at 4.3 V. The cut-off voltage can be 2.0 V or higher and moreover can be 2.5 V or higher. The current value is not limited. Generally, the battery works at a constant current discharge of 0.1 to 3 C. The lithium secondary battery of the invention can be charged and discharged in the broad temperature range of −40° C. to 100° C., preferably within 0 to 80° C.

The present invention is further described by the following examples and comparison examples.

EXAMPLE 1

(Measurement of Oxidation Potential)

$LiPF_6$ was dissolved in propylene carbonate (non-aqueous solvent) to give an electrolyte solution (concentration: 1 M). In the electrolyte solution was dissolved tert-butylbenzene in an amount of 2 weight %. The oxidation potential was measured at room temperature (20° C.) by means of an electrochemical analyzer (Model 608A, available from ALS Corporation). The reference electrode was a lithium metal, and the working electrode was a platinum pole electrode (diameter 1 mm). The scanning was made from +3 V to +6 V at a rate of 10 mV/sec. The potential value at which a current variation of 0.1 mA was observed was determined to be the oxidation potential. The measured value was rounded to two decimal places. As a result, the oxidation potential of tert-butylbenzene was determined to be 4.9 V.

(Preparation of Electrolyte Solution)

A non-aqueous mixture of EC/PC/DEC (30/5/65, volume ratio) was prepared. In the aqueous mixture was dissolved $LiPF_6$ at a concentration of 1 M. Further, tert-butylbenzene was placed in the electrolyte solution at a concentration of 2 weight %.

(Manufacture of Lithium Secondary Battery and Measurements of Battery Characteristics)

$LiCoO_2$ (positive electrode active material, 90 wt. %), acetylene black (electro-conductive material, 5 wt. %), and poly(vinylidene fluoride) (binder, 5 wt. %) were mixed. To the resulting mixture was added 1-methyl-2-pyrrolidone. Thus produced mixture in the form of slurry was coated on aluminum foil, dried, and pressed to give a positive electrode.

Artificial graphite (negative electrode active material, 95 wt. %) and poly(vinylidene fluoride) (binder, 5 wt. %) were mixed. To the resulting mixture was further added 1-methyl-2-pyrrolidone. Thus produced mixture in the form of slurry was coated on copper foil, dried, and pressed to give a negative electrode.

The positive and negative electrodes, a micro-porous polypropylene film separator, and the above-mentioned non-aqueous electrolytic solution were combined to manufacture a cylindrical battery (18650 size, diameter: 18 mm, thickness: 65 mm). The battery were equipped with a pressure-releasable opening and an internal current-disconnecting device.

The 18650 battery was charged at a high temperature (45° C.) with a constant electric current (1.45 A, 1C) under constant voltage to reach 4.2 V and further charged to the terminal voltage 4.2 V. The total period of time was 3 hours. Subsequently, the battery was discharged to give a constant electric current (1.45 A, 1C) to give a terminal voltage of 2.5 V. The charge-discharge cycle was repeated.

The initial discharge capacity was almost the same as the capacity measured in a battery using an 1M $LiPF_4$ and an EC/PC/DEC (30/5/65, volume ratio) solvent mixture (see Comparison Example 1).

After the 300 cycle charge-discharge procedures, the retention of discharge capacity was 85.5% of the initial discharge capacity (100%). The high temperature storage stability was also good. The 18650 battery having been subjected to the 300 cycle charge-discharge procedures was then overcharged by continuously charging the full charged battery further at a room temperature (20° C.) under a constant current (2.9 A, 2C). The current was disconnected after 25 minutes, and the highest surface temperature of the battery after the current disconnection was 68° C.

The materials and conditions of the 18650 size cylindrical battery and the battery characteristics are set forth in Table 1.

EXAMPLE 2

The procedures of Example 1 were repeated except that tert-butylbenzene was added to the electrolyte solution in an amount of 5 weight %, to measure the oxidation potential. The result is set forth in Table 1.

The materials and conditions of the 18650 size cylindrical battery as well as the discharge capacity retention after the 300 cycle charge-discharge procedures, the current disconnection period, and the highest surface temperature of the battery after the current disconnection are set forth in Table 1.

EXAMPLE 3

The procedures of Example 1 were repeated except that each of tert-butylbenzene and cyclohexylbenzene was added to the electrolyte solution in an amount of 1 weight %, to measure the oxidation potentials. The results are set forth in Table 1.

The materials and conditions of the 18650 size cylindrical battery as well as the discharge capacity retention after the 300 cycle charge-discharge procedures, the current disconnection period, and the highest surface temperature of the battery after the current disconnection are set forth in Table 1.

It is understood that the temperature after current disconnection is low and the current disconnection period is short, as compared with those, measured in Example 1. Accordingly, it is understood that the effect of preventing overcharging is higher than that shown in Example 1.

EXAMPLE 4

The procedures of Example 1 were repeated except that 1-bromo-4-tert-butylbenzene was added to the electrolyte solution in an amount of 2 weight %, to measure the oxidation potential. The result is set forth in Table 1.

The materials and conditions of the 18650 size cylindrical battery as well as the discharge capacity retention after the 300 cycle charge-discharge procedures, the current disconnection period, and the highest surface temperature of the battery after the current disconnection are set forth in Table 1.

COMPARISON EXAMPLE 1

The procedures of Example 1 were repeated except that tert-butylbenzene was riot added to the electrolyte solution, to measure the oxidation potential. The result is set forth in Table 1.

The materials and conditions of the 18650 size cylindrical battery as well as the discharge capacity retention after the 300 cycle charge-discharge procedures, the current disconnection period, and the highest surface temperature of the battery after the current disconnection are set forth in Table 1.

COMPARISON EXAMPLES 2 to 4

The procedures of Example 1 were repeated except that, in place of tert-butylbenzene, 4-fluoroanisole (Comparison Example 2), 2-chlorothiophene (Comparison Example 3) or biphenyl (Comparison Example 4) was added to the electrolyte solution in an amount of 2 weight %, to measure the oxidation potential. The results are set forth in Table 1.

The materials and conditions of the 18650 size cylindrical battery as well as the discharge capacity retention after the 300 cycle charge-discharge procedures, the current disconnection period, and the highest surface temperature of the battery after the current disconnection are set forth in Table 1.

EXAMPLE 5

The procedures of Example 1 were repeated except that $LiCoO_2$ (positive electrode active material) was replaced with $LiNi_{0.8}Co_{0.2}O_2$, an electrolyte solution of 1 M $LiPF_6$ in a non-aqueous solvent of EC/PC/VC/DEC (30/5/2/63, volume ratio) was employed, and tert-butylbenzene was added to the electrolyte solution in an amount of 3 weight %, to manufacture a 18650 size cylindrical battery and measure the battery characteristics. The materials and conditions of the 18650 size cylindrical battery and the battery characteristics are set forth in Table 1.

EXAMPLE 6

The procedures of Example 1 were repeated except that $LiCoO_2$ (positive electrode active material) was replaced with $LiNi_{0.8}Co_{0.2}O_2$, an electrolyte solution of 1 M $LiPF_6$ in a non-aqueous solvent of EC/PC/VC/DEC (30/5/2/63, volume ratio) was employed, and tert-butylbenzene and cyclohexylbenzene were added to the electrolyte solution in amounts of 2 weight % and 1 weight %, respectively, to manufacture a 18650 size cylindrical battery and measure the battery characteristics. The materials and conditions of the 18650 size cylindrical battery and the battery characteristics are set forth in Table 1.

COMPARISON EXAMPLE 5

The procedures of Comparison Example 1 were repeated except that $LiCoO_2$ (positive electrode active material) was replaced with $LiNi_{0.8}Co_{0.2}O_2$, to manufacture a 18650 size cylindrical battery and measure the battery characteristics. The materials and conditions of the 18650 size cylindrical battery and the battery characteristics are set forth in Table 1.

EXAMPLE 7

The procedures of Example 1 were repeated except that tert-butylbenzene was replaced with tert-pentyl-benzene in an amount of 2 weight %, to manufacture a 18650 size cylindrical battery and measure the battery characteristics. The materials and conditions of the 18650 size cylindrical battery and the battery characteristics are set forth in Table 1.

EXAMPLE 8

The procedures of Example 1 were repeated except that tert-butylbenzene was replaced with a combination of tert-butylbenzene and tert-pentylbenzeneboth in amounts of 2 weight %, to manufacture a 18650 size cylindrical battery and measure the battery characteristics. The materials and conditions of the 18650 size cylindrical battery and the battery characteristics are set forth in Table 1.

EXAMPLE 9

The procedures of Example 1 were repeated except that tert-pentylbenzene and cyclohexylbenzene were added to the electrolyte solution in amounts of 2 weight % and 1 weight %, respectively, to manufacture a 18650 size cylindrical battery and measure the battery characteristics. The materials and conditions of the 18650 size cylindrical battery and the battery characteristics are set forth in Table 1.

EXAMPLE 10

The procedures of Example 1 were repeated except that tert-butylbenzene, tert-pentylbenzene and cyclo-hexylbenzene were added to the electrolyte solution in amounts of 2 wt. %, 2 wt. %, and 1 wt. %, respectively, to manufacture a 18650 size cylindrical battery and measure the battery characteristics. The materials and conditions of the 18650 size cylindrical battery and the battery characteristics are set forth in Table 1.

In all of the above-mentioned Examples, a sufficient amount of cobalt or nickel was deposited on the negative electrode when the overcharging took place. Accordingly, it is clear that the battery containing the organic compound of the invention are superior to the battery of Comparison Example in the safety in the overcharging and cycle characteristics.

TABLE 1

| | Posi./Nega. | Organic Compound (wt. %) | Oxid. Pot. | Discon. Period (min.) | Max. Temp. (° C.) | Retention after 300 cycle (%) |
|---|---|---|---|---|---|---|
| Ex. 1 | $LiCoO_2$/Art.G. | tert-butyl-benzene (2) | 4.9 | 25 | 68 | 85.5 |
| Ex. 2 | $LiCoO_2$/Art.G. | tert-butyl-benzene (5) | 4.9 | 23 | 66 | 85.1 |
| Ex. 3 | $LiCoO_2$/Art.G. | tert-butyl-benzene (1) | 4.9 | 18 | 64 | 85.3 |
| | | cyclohexyl-benzene (1) | 4.7 | | | |
| Ex. 4 | $LiCoO_2$/Art.G. | 1-bromo-4-tert-butyl-benzene (2) | 4.9 | 26 | 69 | 85.2 |
| Com. 1 | $LiCoO_2$/Art.G. | None | 5.4 | 31 | T.R. | 82.8 |
| Com. 2 | $LiCoO_2$/Art.G. | 4-fluoro-anisole (2) | 4.5 | 22 | 118 | 72.6 |
| Com. 3 | $LiCoO_2$/Art.G. | 2-chloro-thiophene (2) | 4.4 | 19 | 92 | 73.3 |
| Com. 4 | $LiCoO_2$/Art.G. | biphenyl (2) | 4.5 | 18 | 83 | 74.2 |
| Ex. 5 | (comp)/Art.G | tert-butyl-benzene (3) | 4.9 | 24 | 67 | 84.7 |
| Ex. 6 | (comp)/Art.G. | tert-butyl-benzene (2) | 4.9 | 19 | 65 | 84.3 |
| | | cyclohexyl-benzene (1) | 4.7 | | | |
| Com. 5 | (comp)/Art.G. | None | 5.4 | 31 | T.R. | 80.4 |
| Ex. 7 | $LiCoO_2$/Art.G. | tert-pentyl-benzene (2) | 4.8 | 22 | 66 | 85.3 |
| Ex. 8 | $LiCoO_2$/Art.G. | tert-butyl-benzene (2) | 4.9 | 20 | 64 | 85.2 |
| | | tert-pentyl-benzene (2) | 4.8 | | | |
| Ex. 9 | $LiCoO_2$/Art.G. | tert-pentyl-benzene (2) | 4.8 | 17 | 63 | 84.7 |
| | | cyclohexyl-benzene (1) | 4.7 | | | |
| Ex. 10 | $LiCoO_2$/Art.G. | tert-butyl-benzene (2) | 4.9 | 17 | 63 | 84.9 |
| | | tert-pentyl-benzene (2) | 4.8 | | | |
| | | cyclohexyl-benzene (1) | 4.7 | | | |

Remarks: Art.G. = Artificial Graphite
(comp) = $LiNi_{0.8}Co_{0.2}O_2$
Oxid. Pot. = Oxidation Potential
Discon. Period = Current Disconnection Period.
Max. Temp. = Maximum (Highest) Temperature
Retention after 300 cycle = Retention of Discharge Capacity after 300 Charge-Discharge Cycles Procedures
T.R. = Thermal Runaway Composition of Electrolyte Solution (vol. %)

Examples 1-4, Comparison Examples 1-5, and Examples 7-10: 1M $LiPF_6$+EC/PC/DEC (30/5/65, volume ratio)

Examples 5 & 6: 1M $LiPF_6$+EC/PC/VC/DEC (30/5/2/63, volume ratio)

The present invention is not limited to the described examples, and various combinations easily reachable from the concept of the invention can be embodied. Particularly, the invention is not limited to the combination of solvents described in the above-mentioned examples. The above-described examples are concerned with the 18650 size cylindrical battery. However, the invention is applicable to batteries of the prismatic-type, aluminum-laminated type, and coin-type.

Industrial Utility

The lithium secondary battery of the invention dhows good safety for preventing overcharging and further shows good battery characteristics such as cycle characteristics, battery capacity and storage stability.

What is claimed is:

1. A lithium secondary battery which comprises a positive electrode of a composite metal oxide comprising lithium and a metal selected from the group consisting of cobalt and nickel, a negative electrode comprising a lithium metal, a lithium alloy or a material capable occluding and releasing lithium, and a non-aqueous electrolyte solution comprising an electrolyte in a non-aqueous solvent, wherein the non-aqueous electrolyte solution contains 1 to 5 weight % of a combination of a tert-butylbenzene derivative and cyclohexylbenzene, wherein the tert-butylbenzene derivative is selected from the group consisting of tert-butylbenzene, 1-fluoro-4-tert-butylbenzene, 1-chloro-4-tert-butylbenzene, 1-bromo-4-tert-butylbenzene, 1-iodo-4-tert-butylbenzene, 5-tert-butyl-m-xylene, 4-tert-butyltoluene, 3,5-di-tert-butyltoluene, 1,3-di-tert-butylbenzene, 1,4-di-tert-butylbenzene, and 1,3,5-tri-tert-butylbenzene.

2. The lithium secondary battery of claim 1, wherein the tert-butylbenzene derivative is tert-butylbenzene or 1,3-di-tert-butyl-ibenzene.

3. The lithium secondary battery of claim 1, wherein the tert-butylbenzene derivative is contained in an amount of 0.3-3 parts, per one part of the cyclohexylbenzene.

4. The lithium secondary battery of claim 1, wherein the non-aqueous solvent comprises a combination of a cyclic carbonate and a linear carbonate.

5. The lithium secondary battery of claim 1, wherein the non-aqueous solvent contains a cyclic carbonate selected from the group consisting of ethylene carbonate, propylene carbonate, butylene carbonate and vinylene carbonate.

6. The lithium secondary battery of claim 1, wherein the non-aqueous solvent contains a linear carbonate selected from the group consisting of dimethyl carbonate, methyl ethyl carbonate and diethyl carbonate.

7. The lithium secondary battery of claim 1, wherein the negative electrode is graphite.

8. The lithium secondary battery of claim 1, wherein the negative electrode is carbonaceous material having a graphite crystal structure in which a lattice distance of lattice surface (002) is in the range of 0.335 to 0.340 nm.

9. The lithium secondary battery of claim 1, wherein the non-aqueous solvent contains two or more cyclic carbonates.

* * * * *